Patented June 16, 1931

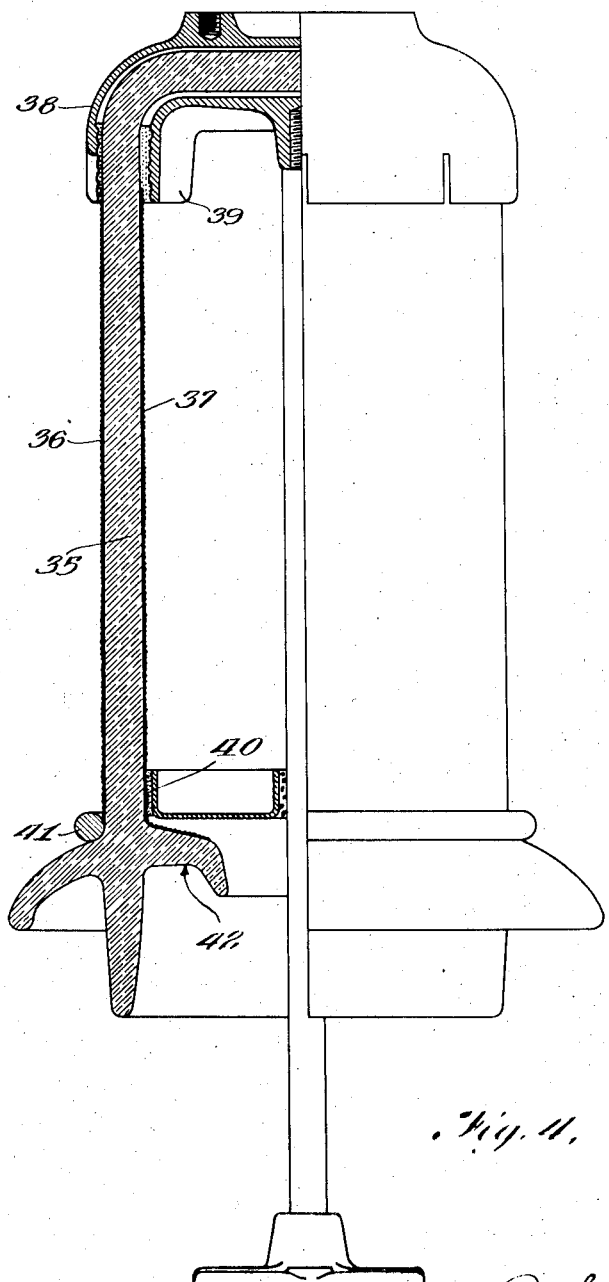

1,810,385

UNITED STATES PATENT OFFICE

ARTHUR O. AUSTIN, OF NEAR BARBERTON, OHIO, ASSIGNOR, BY MESNE ASSIGNMENTS, TO THE OHIO BRASS COMPANY, OF MANSFIELD, OHIO, A CORPORATION OF NEW JERSEY

CONDENSER

Application filed May 27, 1927. Serial No. 194,604.

This invention relates to electrostatic condensers for use in connection with high voltages and has for its object a provision of condenser construction which shall be reliable, economical and of improved construction and operation. Other objects will appear from the following description. The invention is exemplified in the combination and arrangement of parts shown in the accompanying drawings and described in the following specification and it is more particularly pointed out in the appended claims.

In the drawings:

Figs. 2, 3 and 4 are views similar to Fig. 1 showing somewhat modified forms of the invention.

There are many uses for high voltage condensers which may be connected directly to high voltage apparatus or to high voltage transmission lines. These condensers may be used for the electrostatic coupling of carrier telephone equipment, using the high voltage transmission lines as the conductor.

Suitable condensers may also be used for the measurement of voltage; for lightning protection; for taking off power from the transmission line without the use of transformers of line potential; for synchronizing different systems; for the operation of electrostatic relays; for metering; for power factor correction; for the indication of a live line; for testing purposes and other uses for which a condenser is suitable.

Figure 1:
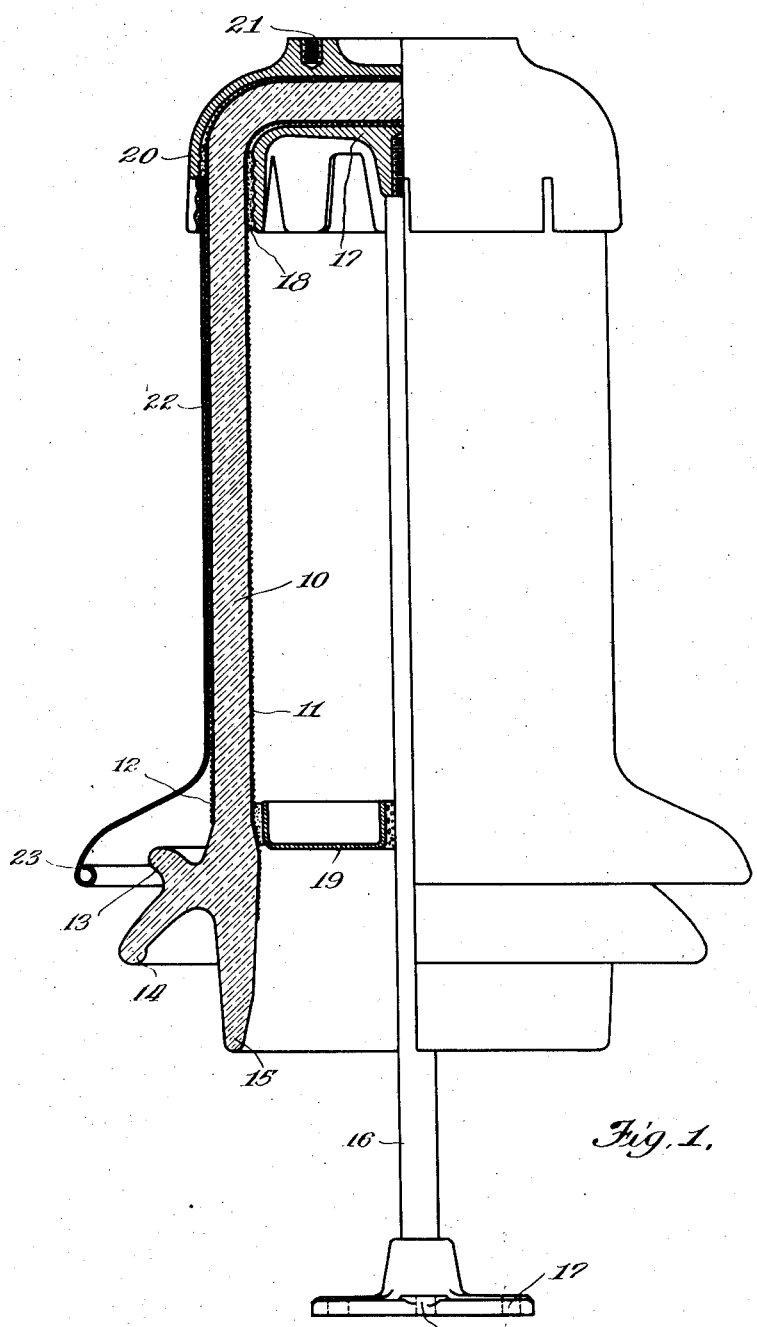
Fig. 1 is an elevation with parts in section showing one embodiment of the invention.

The usual method of building condensers has been to use small sheets of mica, paper or other material. Glass and other materials have also been used but the difficulties of manufacture or danger of carbonization and the effect of the weather are serious drawbacks in these types. In order to do away with the usual disadvantages, a new type has been devised. One form of this is shown in Fig. 1 which consists essentially of a large closed cylinder 10 of dielectric material such as porcelain, with coated or metallized surfaces 11 and 12 which form a condenser with a dielectric 10. The dielectric 10 has weather sheds or petticoats 13, 14 and 15 integral with the dielectric member 10 so that any leakage between the two surfaces must be forced over these insulating sections which are not metallized. The condensers consist essentially of a very large condenser area compared to the insulating surfaces 13, 14 and 15, to obtain economy. By providing the condensers with suitable mounting mechanism, they may be mounted in multiple to obtain any desired electrostatic capacity and in series to provide a factor of safety for practically any voltage.

In the embodiment illustrated in Fig. 1, a support for the dielectric member 10 is provided in the form of a post 16 having a base 17 with openings 18 through which cap screws may be inserted for securing the base upon a support or upon another condenser. At the top of the support 16 is a spider 17 which may be cemented at 18 to the upper, inner portion of the dielectric member 10. A second spider or brace 19 is secured to the post 16 and the interior of the dielectric 10 near the bottom of the dielectric member.

A cap 20 is cemented to the top of the dielectric member and provided with threaded openings 21 for receiving the cap screws of a second condenser mounted on top of the cap 20. A metallic weather shield 22 may enclose the outer surface of the condenser 10, the weather shield being provided with a flange or petticoat 23 at its lower end. The coating on the surfaces of the dielectric member 10 may be held in place by roughening or sanding the surface and metallizing the roughened surface or covering it with a coating of other suitable conducting material. It will be apparent that a number of condensers can be secured, one on top of the other, and that the condensers thus stacked may be connected with one another in series, or parallel.

Figure 2:
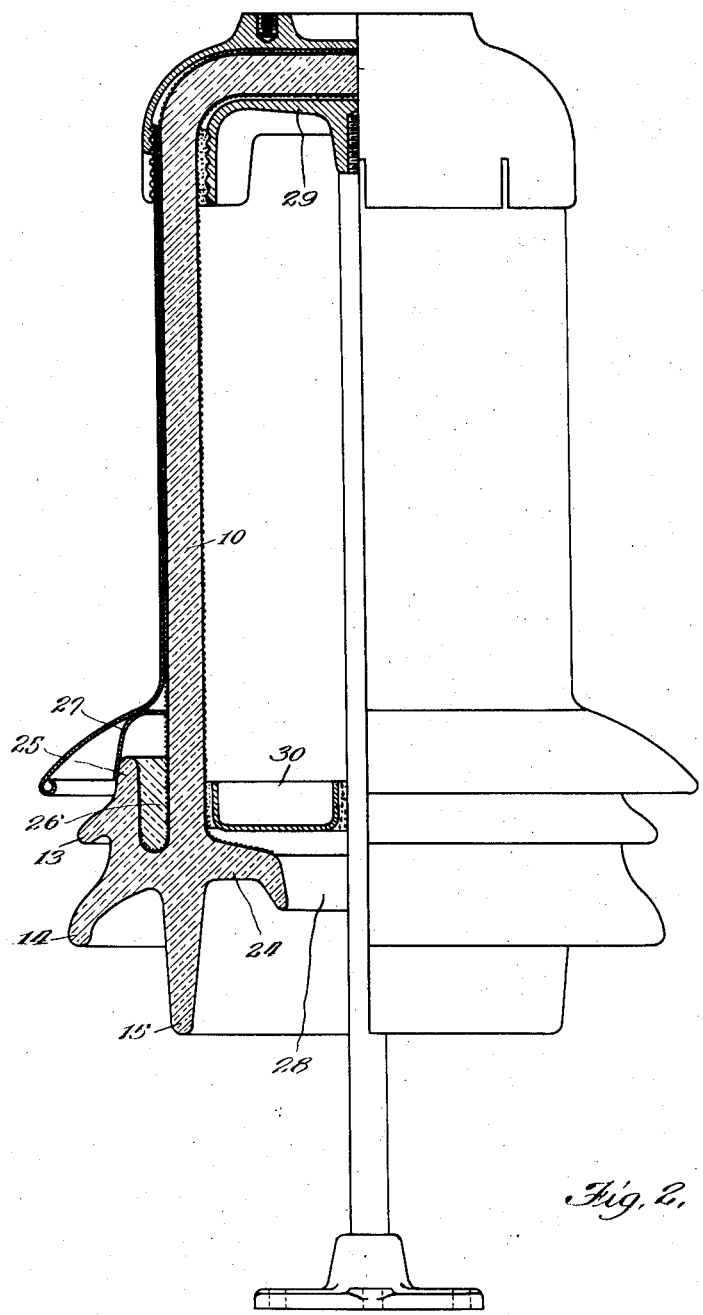

In the form of the invention shown in Fig. 2, the construction is similar to that of Fig. 1 but the inner face of the condenser is provided with an inwardly extending flange 24 and an upwardly extending flange 25 on the outer surface of the condenser provides a pocket 26, the inner surface of which is metalized and the pocket is filled with a dielectric compound. A metallic cover 27 may be employed for closing the top of the pocket 26. It will be apparent that the conductor lining of the pocket 26 and the conductor covering of the upper face of the flange 24, form, in effect, insulated flux control members which tend to prevent concentration of lines of force and counteract the tendency of the condenser to discharge over the flanges 13, 14 and 15. Because of the restricted opening 28 formed by the flange 24, the supporting spiders 29 and 30 will be elongated in shape, leaving them of less dimension in one direction than the diameter of the opening 28 so that they may be passed through the opening 28 into the interior of the dielectric member 10.

Figure 3:
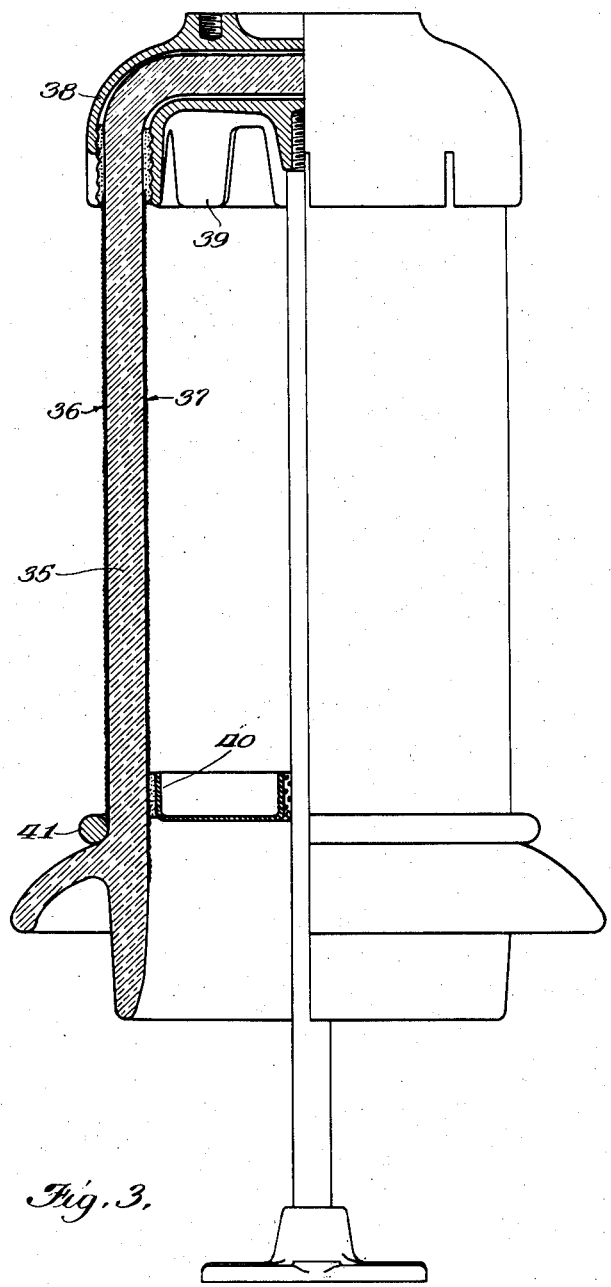

Fig. 3 shows a different form of the condenser element in which the dielectric member 35 is provided with metallized surfaces 36 and 37 with attaching members 38, 39 and 40. The metallized coating is not protected with a weather shed as in Figs. 1 and 2, although it is evident that this might be readily applied if desired. A small ring or bead 41 is placed around the bottom of the metallized coating to reduce the possibility of brush discharge and to withstand an arc in case of flash-over under an abnormally high voltage. The form of the dielectric adapts itself readily to manufacturing conditions. In other respects the condenser element is similar to Figs. 1 and 2.

Fig. 4 is similar to Fig. 3 except that an inner petticoat 42 has been added similar to that in Fig. 2, to increase the leakage, surface, increase the resistance to arcing between the inner and outer coatings and also to make it possible to increase the voltage at which corona or discharge will start over the surface.

I claim:

1. A condenser comprising a tubular dielectric member having the upper end thereof closed, conductor coatings on the outer and inner surfaces of said member terminating back of the lower end of said member and an upwardly curved dielectric flange on the outer surface of said member between the termination of the outer coating and the open end of said member and a metallic weather shield on the outer surface of said member having an outwardly projecting flange overlying said dielectric flange.

2. A condenser comprising a hollow cylindrical porcelain member having one end thereof closed and having its outer and inner surfaces roughened and metallized, a standard extending into the interior of said member and connected thereto near the closed end of said member, a brace within said member connecting said member and standard at a point spaced inwardly from the open end of said member, inner and outer dielectric flanges on said member between the termination of said metallized surfaces and the open end of said member, a cap secured to the outer closed end of said member and a weather shield surrounding said member and having its upper end extending beneath said cap and having its lower end provided with a flange overlying the outwardly extending dielectric flange on said member.

3. A condenser comprising a tubular dielectric member, a conductor element disposed adjacent the inner surface of said member, a conductor coating disposed on the outer surface of said member and a metallic housing disposed over said metallic coating and diverging outwardly from said coating at a point spaced backwardly from the extremity of said metallic coating.

4. A condenser comprising a tubular dielectric member, a conductor element disposed within said member, a metallic coating disposed on the outer surface of said member and terminated back of the edge of said member, a dielectric flange interposed between the edge of said member and the termination of said metallic coating, and a sheet metal cover disposed over said metallic coating and flared outwardly from said coating at a point back of the termination of said metallic coating and forming a flange overlying the flange of said dielectric member.

5. A condenser comprising a tubular, dielectric member, coverings of conducting material on the outer and inner surfaces of said member respectively, said coverings being terminated back of the terminal edge of said tubular member, and a flange of dielectric material on the surface of said tubular member, said flange being directed backwardly from the terminal edge of said member forming a pocket separated from the edge of said member by dielectric material and conducting material disposed in said pocket and electrically connected with the covering of conducting material for the surface of said member on which said flange is formed.

6. A condenser comprising a hollow dielectric cylinder having its upper end closed and its lower end open, coverings of conducting material on the outer and inner surfaces of said cylinder respectively, a backwardly directed flange surrounding said cylinder adjacent the lower end thereof but spaced upwardly from said end forming a pocket surrounding said cylinder, said pocket being closed in its lower end by said flange, the covering for the outer surface of said cylinder extending into said pocket, and means for excluding water from said pocket.

7. An insulator comprising a hollow porcelain cylinder having the upper end thereof closed and having the lower end thereof open, the wall of said cylinder at its lower end being circumferentially bifurcated forming diverging flanges with spaced edges and an air pocket between said flanges, coverings of conducting material for the outer and inner surfaces of said cylinder, said coverings being terminated a distance above the lower end of said cylinder at substantially opposite portions of said surfaces and at the side of said flanges away from the lower end of said cylinder, said coverings being separated from each other by a single integral layer only of the material of said cylinder, and terminals of conducting material electrically connected with said coverings respectively.

8. A condenser comprising a unitary, integral, dielectric, tubular member having one end closed and the other end open, conductor coverings on the inner and outer surfaces of said member, both of said coverings terminating at points spaced from the open end of said member leaving a portion of the rim of said member uncovered by conducting material, a flange on the surface of said member, in addition to the uncovered portion of said rim, said flange being located between the termination of one of said conductor covers and the open end of said member, and terminal conductors electrically connected with said conductor coverings respectively.

9. A condenser comprising a unitary, integral, hollow cylinder of dielectric material having one end closed and the other end open, conductor coverings on the inner and outer surfaces of said member, both coverings terminating back of the open end of said cylinder, and leaving a portion of the rim of said cylinder uncovered by conducting material, a dielectric flange on the outer surface of said cylinder, in addition to the uncovered portion of said rim, said flange being located between the termination of the outer conductor covering and the end of said member, and terminal conductors electrically connected with said conductor coverings respectively, and arranged to support said dielectric member with the closed end thereof uppermost.

10. A condenser comprising a hollow, integral, cylinder formed of a single layer of dielectric material having one end thereof closed and the outer end open, conductor coverings on the outer and inner surfaces of said layer terminating back of the open end thereof, a post extending into the interior of said cylinder and fixed to the inner surface of said layer of dielectric material and electrically connected with the conductor covering on the inner surface of said layer, said post having a supporting base at the lower end thereof, and a cap secured at the closed end of said member to the opposite surface of said single layer of dielectric material from said post, and electrically connected with the conductor coverings on the outer surface of said dielectric member and arranged for connection with the supporting base of a similar cooperating condenser.

11. A condenser comprising a tubular, dielectric member having one end thereof closed and the other end open, conductor coverings on the outer and inner surfaces of said member terminating back of the open end of said member, a cap secured to the closed end of said member and electrically connected with said outer conducting covering, and a standard secured to the interior of said member and electrically connected with the inner conductor covering, said standard having a base projecting from the open end of said member and adapted to be secured to the cap of a similar complementary condenser, said cap and standard being separated from each other by a single integral layer, only, of dielectric material.

12. A condenser comprising a dielectric member and conductor elements separated by said dielectric member, one of said conductor elements being bifurcated at its edge to divide the electrostatic flux at the edge of said element.

13. A condenser comprising conductor elements and a dielectric member interposed between said elements, one of said conductor elements being bifurcated adjacent the edge thereof to form spaced terminals for the edge of said element, and means for minimizing the tendency to discharge from the bifurcated portions of said element.

In testimony whereof I have signed my name to this specification on this 21st day of May, A. D. 1927.

ARTHUR O. AUSTIN.